United States Patent
Singh et al.

(10) Patent No.: US 9,637,409 B2
(45) Date of Patent: May 2, 2017

(54) LOW MELTING GLASS COMPOSITIONS

(71) Applicant: Ferro Corporation, Mayfield Heights, OH (US)

(72) Inventors: Sandeep K. Singh, Strongsville, OH (US); George E. Sakoske, Independence, OH (US)

(73) Assignee: Ferro Corporation, Mayfield Heights, OH (US)

(*) Notice: Subject to any disclaimer, the term of this patent is extended or adjusted under 35 U.S.C. 154(b) by 581 days.

(21) Appl. No.: 13/865,440

(22) Filed: Apr. 18, 2013

(65) Prior Publication Data

US 2014/0314969 A1 Oct. 23, 2014

(51) Int. Cl.
C03C 8/24 (2006.01)
C03C 3/066 (2006.01)
C03C 8/04 (2006.01)
C03C 3/155 (2006.01)

(52) U.S. Cl.
CPC ............... *C03C 8/24* (2013.01); *C03C 3/066* (2013.01); *C03C 3/155* (2013.01); *C03C 8/04* (2013.01); *Y10T 428/1064* (2015.01); *Y10T 428/239* (2015.01)

(58) Field of Classification Search
None
See application file for complete search history.

(56) References Cited

U.S. PATENT DOCUMENTS

| | | | |
|---|---|---|---|
| 4,855,261 A | 8/1989 | Mizuno et al. | |
| 5,674,789 A * | 10/1997 | Anquetil | C03C 3/068 501/22 |
| 6,124,224 A | 9/2000 | Sridharan et al. | |
| 7,176,152 B2 | 2/2007 | Brown et al. | |
| 7,291,573 B2 | 11/2007 | Ide | |
| 7,524,781 B2 | 4/2009 | Nagashima et al. | |
| 2007/0236147 A1 | 10/2007 | Onoda | |
| 2009/0146564 A1* | 6/2009 | Bae et al. | 313/582 |
| 2009/0315057 A1* | 12/2009 | Konishi et al. | 257/98 |
| 2011/0209813 A1* | 9/2011 | Shibuya et al. | 156/89.12 |
| 2012/0114904 A1* | 5/2012 | Yanase et al. | 428/141 |
| 2012/0282407 A1 | 11/2012 | Singh et al. | |
| 2013/0104980 A1 | 5/2013 | Sridharan et al. | |
| 2013/0111953 A1 | 5/2013 | Maloney et al. | |

FOREIGN PATENT DOCUMENTS

EP 1653499 A1 5/2006
JP WO2011004844 * 1/2011

* cited by examiner

Primary Examiner — Anthony J Frost
(74) Attorney, Agent, or Firm — Rankin, Hill & Clark LLP

(57) ABSTRACT

A glass composition comprising $B_2O_3$, $Na_2O$, $Al_2O_3$, $Li_2O$, $TiO_2$, $ZnO$, $Ta_2O_5$, $Nb_2O_3$, $BaO$, $ZrO_2$ and $SiO_2$, and devoid of lead, bismuth, and vanadium. Pastes comprising the glass composition and devices including seals comprising such pastes are contemplated.

20 Claims, 1 Drawing Sheet

LOW MELTING GLASS COMPOSITIONS

BACKGROUND OF THE INVENTION

1. Field of Invention

The invention describes a new method for forming glass compositions having low melting points and low thermal expansion. Described herein are various materials, seal designs, and geometries of seals based on glass powders. The glass composition of the invention includes $B_2O_3$, $Na_2O$, $Al_2O_3$, $Li_2O$, $TiO_2$, ZnO, $Ta_2O_5$, $Nb_2O_3$, BaO, $ZrO_2$ and $SiO_2$, and is devoid of lead, bismuth, and vanadium.

2. Description of Related Art

Conventional formation of hermetic seals for electronic devices such as thin layer solar cells or OLEDs involves the application of organic pastes or tapes at the edges of the device followed by curing cycles that are induced thermally, with ultraviolet light or chemically. Organic sealants are not truly hermetic and sometimes contain getters to mitigate their non-hermeticity. Truly hermetic seals can be made from glass based systems by printing and firing a paste composition including a glass fit and organic solvent/binder system. Drawbacks of such systems include the need to fire at extremely high temperatures, e.g., 800° C., and the problem of entrapment of organic residue and incomplete burnout of the binder system (such as ethyl cellulose) within the hermetic seal. Such entrapment causes undesired contamination of sealed active sealed, such as solar cells or OLEDs, within the hermetic seal.

Conventional glass sealing methods and compositions may have too high or too low an expansion (CTE) relative to a substrate glass plate and also too high a melting point. A melt point that is too high may result in warpage of glass substrates or damage to the seal itself.

The present invention relates to a low melting glass, a sealing composition and a sealing paste, and more particularly to those which contains no lead, no vanadium and no bismuth component and are used for manufacturing of a flat panel display such as plasma display panel (PDP), liquid crystal display (LCD) or light emitting diode (LED).

Conventionally, a sealing composition used to seal the periphery of PDP, LCD or LED was generally a lead-based material or the like. Recently the market, under environmental pressures, has demanded a composition that does not contain hazardous components such as lead, bismuth or vanadium, and can seal at a low temperature.

As a low melting glass not containing lead or vanadium component, there are known phosphate glass (U.S. Pat. No. 5,256,604) and bismuth glass (U.S. Pat. No. 5,733,828, U.S. Pat. No. 5,346,863), among which bismuth glass attracts much attention because it can be fired at a low temperature and exhibits adequate chemical endurance.

Accordingly improvements are sought in sealing processes.

BRIEF SUMMARY OF THE INVENTION

The present invention relates to a glass fit-based system for sealing glass plates, seal materials, and methods to apply these seal materials, seal designs and geometries for selective and controlled absorption of light to heat and seal the system. These seals are useful in various applications such as (a) encapsulating solar cells based on silicon, organic systems, and thin film, (b) encapsulating other electronic devices such as organic LEDs (OLED), (c) Vacuum Insulated Glass (VIG) assemblies for windows, (d) touch screen devices and (e) architectural windows and automotive glass based assemblies. The seal materials can be cured/fired at low temperatures—less than about 600° C.

The glass frit-based systems of the invention are also useful in preparing thick films, such as conductive, resistive or dielectric pastes. The various pastes can be used in electronic circuits and devices. The thick film circuit is a form of monolithic integrated microelectronic circuit. Circuits of this type are particularly useful where a large number of passive components are required, or where moderately high power dissipation is required. Thick film circuits are less costly to produce and can yield a broader range of resistance values than thin film circuits.

A variety of metal-containing thick film compositions (i.e., pastes, inks, tapes, etc.) useful in forming resistors, dielectrics and conductors which are employed in hybrid microelectronic components have been developed in the field of hybrid microelectronics. Generally, such compositions, and particularly paste or ink compositions, include a conductor (e.g., silver, palladium, copper, aluminum, gold, platinum, and the like as well as alloys of each of these different metals), resistive or dielectric components, a binder or an inorganic fluxing material, (e.g., a glass of the invention or inorganic oxides), and an organic vehicle.

Electronic devices upon which the glass composition can be applied and fired include thick film and/or hybrid thick film devices such as, for example, surge resistors (thick film resistors printed on alumina substrates that are used to protect telephone lines from lightning or other electrical over voltage conditions), high-current, high-power automotive electronics (e.g., air bag deployment sensors, weight-sensors, anti-lock braking systems, and a variety of other automotive sensors), defrosters and thick film circuitry on automotive windshields and solar cells in solar panels such as the conductive leads on such devices. Throughout the instant specification and in the appended claims, the term "electronic device" means any electronic device that includes thick film and/or hybrid thick film circuitry that would survive at least the firing temperatures disclosed herein and benefit from the protection provided by a paste or thick film including the glass compositions of the invention. More details on thick film pastes and their applications can be found in commonly owned U.S. Pat. No. 7,176,152 issued 13 Feb. 2007, incorporated by reference.

A variety of substrates including those made of glass, metal, ceramic, and plastics, (as well as those constituting active devices) may be sealed together by this invention to create a hermetic seal in devices such as display devices (flat panel screens, LED screens, LCD screens, plasma display panels), organic light emitting diodes (OLEDs), solar cells and solar cell panels, and even windows for both architectural and automotive applications. The substrates may be coated with a coating such as conductive coated glass, indium tin oxide, aluminum doped zinc oxide, sputtered metals, antireflective coatings, $SiN_X$ coatings, $Si_3N_4$ coatings, and combinations thereof.

A new range of bismuth glasses has been developed by the inventors herein having a coefficient of thermal expansion (CTE) of 9.0 to $11.0 \times 10^{-6}/°$ C. Practically and functionally this is quite different from glasses having a coefficient of thermal expansion (7.0 to $8.0 \times 10^{-6}/°$ C.). Such new and inventive glasses are used for sealing of a display and its accessories (such as a flat backlight). In order to match the CTE of the substrate(s), the bismuth glass of the invention can be blended with low expansion refractory fillers, which increases the viscosity of sealing material and sealing is difficult at less than 550° C. Also, due to high cost of bismuth oxide; it is desirable to develop a composition which satisfies the requirements for the application and is bismuth free. Therefore, a need exists for glass compositions for sealing application which exhibit good thermal expansion, low melting, environmental friendly and cost effective. These requirements are achieved with this invention without bismuth.

The aim of the invention is to provide a glass composition, especially for LCD, PDP or LED sealing, in which the environmental aspects are taken into consideration. For example, the glass is lead free and vanadium free and at the same time the production cost does not differ considerably (i.e., bismuth free) from that of a traditional glass. The present invention provides new and useful glass compositions which exhibit various distinct advantages over prior art glass compositions.

In particular, there is a need for low melting, low expansion glasses, having, for example, melting points less than 600° C., less than 550° C. or more preferably less than 500° C. that also have low expansion, for example CTE of less than 9.0, preferably less than 8.5, more preferably less than $8.0 \times 10^{-6}$/° C.

The glasses of the invention include high boron contents, $B_2O_3$ contents of at least 45 wt %, preferably at least 50 wt %, up to as much as 85 wt %. The glasses are devoid of lead, vanadium and bismuth. Also on environmental grounds, they may be devoid of cadmium.

There is an urgent need for moisture barrier films and edge seals for thin film, crystalline silicon solar cell modules, optoelectronic devices (e.g., LEDs, OLEDS), displays (such as plasma display panel (PDP) and Microdisplays), and vacuum insulated glass windows (VIG) and assemblies. The lifespan of solar devices could be increased by protecting them from moisture and oxygen ingress which in turn will reduce the levelized cost of energy (LCOE). Similarly the service life of VIG windows in providing insulation of thermal conduction can be extended if the seals are effectively impervious to moisture and gas.

An embodiment of the invention is a method of producing a seal, comprising: (a) providing at least two substrates, (b) providing a seal material, comprising the glass composition of claim 1, (c) contacting the seal material to the at least two substrates, and (d) firing the seal material to a temperature of no greater than 600° C., whereby a seal between the substrates results.

DETAILED DESCRIPTION OF THE INVENTION

Figure 1A:
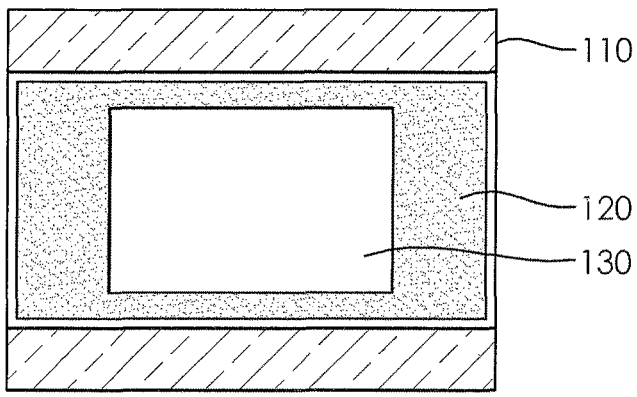
FIG. 1A shows a first substrate coated with a paste of the invention and prior to sealing and firing.

The present invention provides materials, seal designs, geometries and process steps for making hermetic seals, and simplifying the manufacture of hermetic seals which are used to protect active layers of electronic devices such as solar cells, LEDs, OLEDs, plasma display panels and the like.

A variety of substrates including those made of glass, metal, ceramic, or plastics, as well as those constituting active devices may be sealed together by this invention to create a hermetic seal in devices such as display devices (flat panel screens, LED screens, LCD screens, plasma display panels), organic light emitting diodes (OLEDs), solar cells and solar cell panels, and even windows for both architectural and automotive applications. The substrates may be coated with a coating such as conductive coated glass, indium tin oxide, aluminum doped zinc oxide, sputtered metals, antireflective coatings, $SiN_X$ coatings, $Si_3N_4$ coatings, conductive polymer coatings on glass, and combinations thereof.

The seals may be hermetic, with a hermeticity as measured by helium leak rate of less than $10^{-5}$ atm*cc*sec$^{-1}$, preferably less than $10^{-7}$ atm*cc*sec$^{-1}$, more preferably less than $10^{-8}$ atm*cc*sec$^{-1}$.

The major components of the invention are set forth hereinbelow.

Substrate. The substrates can be, broadly speaking, glass, ceramic, glass-ceramic, metal, or polymeric. They are independently selected. Composite substrates are also suitable, for example polymer matrix composites, polymer glass composites, metal matrix composites, or ceramic matrix composites. In particular the substrates may be any of metal, glass, glass-ceramics, very low expansion glass ceramics, ceramics, window glass, low expansion borosilicate glass such as Borofloat® 33 glass, aluminosilicate glass, surface strengthened alkali aluminosilicate glass, ion exchanged alkali aluminosilicate glass (such as Corning Gorilla® Glass), tempered glass, surface strengthened metal coated glass e.g. silver layer for charging to powder coat, conductive substrates, conductive oxides, indium tin oxide, fluorinated tin oxide, transparent conductive oxides, coated substrates and conductive polymers.

The substrates may have a coating. Exemplary coated substrates include metal coated glass, wherein at least one metal is selected from the group consisting of silver, copper, tin, and aluminum is applied to a glass plate in a pattern selected from the group consisting of full covering, partial covering, and conductive traces.

Yet another embodiment of this invention involves at least one glass plate being tempered.

Yet another embodiment of this invention is where at least one glass plate is a prelaminated glass assembly.

Yet another embodiment of this invention includes at least one glass plate being coated with conductive coatings such as transparent conductive oxide (TCO) using indium-tin oxide (ITO) material.

Glass Frits. The glass frits used herein are blended into an organic vehicle, applied to a substrate, and fired to make a seal. The glass frits that form the heart of the sealing materials herein are made as follows. The glass compositions are formed by blending the starting materials (oxides or oxide precursors) and melting at a temperature of about 900 to 1250° C. for about 45 minutes to form a molten glass having the desired composition. Other smelting times and temperatures are possible. The molten glass formed can then be suddenly cooled, e.g., roll quenched, in a known manner to form a sheet shape or flakes. The glass flakes can then be ground using conventional milling techniques to a fine particle size, such as 1 to 20 microns, preferably 5 to 15 microns, more preferably 6 to 10 microns.

The finely ground glass frit can be combined with an organic vehicle to form a printable glass sealing paste. The glass paste in general will contain from about 85 to about 60 wt % solids as above described and about 15 to about 40 wt % of the suitable organic vehicle. The viscosity of the paste is adjusted so that it can be screen printed, roll coated or sprayed onto the desired substrate.

The vehicle to be employed in the paste is selected on the basis of its end use application. It is essential that the vehicle adequately suspend the particulates and burn off completely upon firing of the paste on the substrate. Vehicles are typically organic and include compositions based on pine oils, vegetable oils, mineral oils, low molecular weight petroleum fractions, tridecyl alcohols, synthetic and natural resins, and the like. Surfactants and/or other film forming modifiers can also be included.

The specific vehicle and amounts employed are selected based upon the specific components of the paste and the desired viscosity. In general, the amount of the vehicle is about 15 to about 40% by weight based upon the total weight of the enamel paste.

In general, the glass pastes are viscous in nature, with the viscosity depending upon the application method to be employed and end use. For purposes of screen-printing, viscosities ranging from 10,000 to 80,000 and preferably 35,000 to 65,000 centipoises at 20° C., as determined on a Brookfield Viscometer, #7 spindle at 20 rpm, are appropriate.

To prepare the sealing compositions of the invention, the necessary glass flakes are ground to a powder using conventional methods ($d_{50}$~6-10 microns). The low melting glass component is then mixed with the necessary vehicle to form the sealing paste. The viscosity is adjusted as desired.

Once the sealing paste is prepared, it can be applied to the substrate in a conventional manner such as by screen printing, decal application, spraying, brushing, roller coating or the like. Screen printing is preferred when the paste is applied to a glass substrate. After application of the glass paste to a glass substrate in a desired pattern, the applied coating is then fired to bond the glass to the substrate. The firing temperature is generally determined by the glass maturing temperature, and preferably is in a temperature range of 480-560° C.

Glass Frits. More specifically, the glasses of the invention may be presented in alternate embodiments in the following Table 1.

is a glass composition comprising: (a) 45-81 wt % $B_2O_3$, (b) 1-7 wt % $Na_2O$, (c) 0.1-5 wt % $Al_2O_3$, (d) 0.1-2 wt % $Li_2O$, (e) 0.5-6 wt % $TiO_2$, (f) 0.1-9 wt % $ZnO$ and (g) 4-25 wt % $BaO$.

An embodiment of the invention is a glass composition comprising (a) 62-81 wt % $B_2O_3$, (b) 5-7 wt % $Na_2O$, (c) 0.1-4 wt % $Al_2O_3$, (d) 0.1-2 wt % $Li_2O$, (e) 1.5-3.5 wt % $TiO_2$, and (f) 0.2-3 wt % $ZnO$.

Either of the two above mentioned embodiments may further comprise at least one of (h) 0.1-5 wt % $Ta_2O_5$, (i) 0.1-3 wt % $Nb_2O_3$, (j) 0.1-4 wt % $ZrO_2$ and (k) 0.1-5 wt % $SiO_2$. Alternately these embodiments may further comprise all oxides in the preceding sentence. Alternately, any of these embodiments may further comprise at least one of (g) 5-25 wt % $Ta_2O_5$, (h) 6-15 wt % $Nb_2O_3$, (i) 3-5 wt % $BaO$, 0.1-5 wt % $ZrO_2$, and 0.1-5 wt % $SiO_2$. Alternately these embodiments may further comprise all oxides in the preceding sentence.

Another embodiment of the invention is a method of producing a seal, comprising: (a) providing at least two substrates, (b) providing a seal material, comprising any glass composition disclosed herein, (c) contacting the seal material to the at least two substrates, and (d) firing the seal material to a temperature of no greater than 600° C., whereby a seal between the substrates results.

An embodiment of the invention is a paste comprising any glass disclosed herein together with an organic vehicle. In a preferred embodiment, the organic vehicle includes at least one of a thermoplastic resin, a solvent, and a surfactant.

An embodiment of the invention is a device including a seal, the device formed by a method of heating a sealing material comprising: (a) providing at least two substrates, (b) providing a sealing material, comprising any glass composition disclosed herein, (c) contacting the seal material to the at least two substrates, and (d) firing the seal material to a temperature of no greater than 600° C., whereby a seal between the substrates results.

Organic Vehicle. The pastes herein include a vehicle or carrier (sometimes called a binder) which is typically a solution of a resin dissolved in a solvent and, frequently, a solvent solution containing both resin and a thixotropic

TABLE 1

Glass Frit Compositions - Oxides in wt %.

| Oxide Component | Broad Range (wt %) | Preferred Range (wt %) | More Preferred Range (wt %) |
| --- | --- | --- | --- |
| B2O3 | 40-85 | 45-81 | 55-80.5 |
| Na2O | 0-10 | 0.5-9.0 | 1-6.5 |
| Al$_2$O$_3$ | 0-20 | 0.5-18.5 | 1.0-15.5 |
| Li$_2$O | 0-2 | 0.3-1.8 | 0.5-1.6 |
| TiO2 | 0-6 | 0.2-5.5 | 0.3-4.5 |
| ZnO | 0-15 | 0.2-11.5 | 0.3-10 |
| Ta2O5 | 0-30 | 0-26 | 0-25 |
| Nb$_2$O$_3$ | 0-16 | 0-15.5 | 0-15 |
| BaO | 0-45 | 0-20 | 0-10 |
| ZrO$_2$ | 0-5 | 0-4.6 | 0-3.8 |
| SiO$_2$ | 0-5 | 0-4.5 | 0-4.0 |

In order to get desired properties such as low firing, expansion compatible with substrates of interest, the compositional ranges of individual oxides of the inventive frits are formulated to fall within the above ranges, or in the ranges that follow.

An embodiment of the invention is a glass composition comprising $B_2O_3$, $Na_2O$, $Al_2O_3$, $Li_2O$, $TiO_2$, $ZnO$, $Ta_2O_5$, $Nb_2O_3$, $BaO$, $ZrO_2$ and $SiO_2$, and devoid of lead, bismuth, and vanadium. In particular, an embodiment of the invention agent. The glass frits can be combined with the vehicle to form a printable paste composition. The vehicle can be selected on the basis of its end use application. In one embodiment, the vehicle adequately suspends the particulates and burn off easily upon firing of the paste on the substrate. Vehicles are typically organic. Examples of solvents used to make organic vehicles include alkyl ester alcohols, terpineols, and dialkyl glycol ethers, pine oils, vegetable oils, mineral oils, low molecular weight petroleum fractions, and the like. In another embodiment, surfactants and/or other film forming modifiers can also be included.

The amount and type of organic vehicles utilized are determined mainly by the final desired formulation viscosity, rheology, fineness of grind of the paste, substrate wettability and the desired wet print thickness. In one embodiment, the paste includes about 15 to about 40 wt % of the vehicle. In another embodiment, the paste includes about 20 to about 35 wt % of the vehicle.

The vehicle typically includes (a) up to 80 wt % organic solvent; (b) up to about 15 wt % of a thermoplastic resin; (c) up to about 4 wt % of a thixotropic agent; and (d) up to about 15 wt % of a wetting agent. The use of more than one solvent, resin, thixotrope, and/or wetting agent is also envisioned. Ethyl cellulose is a commonly used resin. However, resins such as ethyl hydroxyethyl cellulose, wood rosin, mixtures of ethyl cellulose and phenolic resins, polymethacrylates of lower alcohols and the monobutyl ether of ethylene glycol monoacetate can also be used. Solvents having boiling points (1 atm) from about 130° C. to about 350° C. are suitable. Widely used solvents include terpenes such as alpha- or beta-terpineol or higher boiling alcohols such as Dowanol® (diethylene glycol monoethyl ether), or mixtures thereof with other solvents such as butyl Carbitol® (diethylene glycol monobutyl ether); dibutyl Carbitol® (diethylene glycol dibutyl ether), butyl Carbitol® acetate (diethylene glycol monobutyl ether acetate), hexylene glycol, Texanol® (2,2,4-trimethyl-1,3-pentanediol monoisobutyrate), as well as other alcohol esters, kerosene, and dibutyl phthalate.

The vehicle can contain organometallic compounds, for example those based on aluminum, boron, zinc, or cobalt, nickel, titanium and combinations thereof, to modify the contact. N-Diffusol® is a stabilized liquid preparation containing an n-type diffusant with a diffusion coefficient similar to that of elemental phosphorus. Various combinations of these and other solvents can be formulated to obtain the desired viscosity and volatility requirements for each application. Other dispersants, surfactants and rheology modifiers, which are commonly used in thick film paste formulations, can be included. Commercial examples of such products include those sold under any of the following trademarks: Texanol® (Eastman Chemical Company, Kingsport, Tenn.); Dowanol® and Carbitol® (Dow Chemical Co., Midland, Mich.); Triton® (Union Carbide Division of Dow Chemical Co., Midland, Mich.), Thixatrol® (Elementis Company, Hightstown N.J.), and Diffusol® (Transene Co. Inc., Danvers, Mass.); Akzo Nobel's Doumeen® TDO (tallowpropylene diamine dioleate) and DisperBYK® 110 or 111 from Byk Chemie GmbH. Disperbyk 110 is a solution of a copolymer with acidic groups having an acid value of 53 mg KOH/g; density of 1.03@20° C. and a flash point of 42° C. Disperbyk 111 is a copolymer with acidic groups having an acid value of 129 mg KOH/g, a density of 1.16 and a flash point over 100° C. A vehicle including oleic acids, DisperBYK 111 and Duomeen TDO is preferred.

Among commonly used organic thixotropic agents is hydrogenated castor oil and derivatives thereof. A thixotrope is not always necessary because the solvent coupled with the shear thinning inherent in any suspension can alone be suitable in this regard. Furthermore, wetting agents can be employed such as fatty acid esters, e.g., N-tallow-1,3-diaminopropane dioleate; N-tallow trimethylene diamine diacetate; N-coco trimethylene diamine, beta diamines; N-oleyl trimethylene diamine; N-tallow trimethylene diamine; N-tallow trimethylene diamine dioleate, and combinations thereof.

Active Layer. An active layer is an electric or electronic device that is protected by the substrates and the seals of the invention. Suitable active layers include vacuum insulated glass, solar cell contact, solar cell, solar cell module, organic PV device, plasma display device, nanocrystal display, electrochromic device, electrochromic material system, sensors, suspended particle device, micro-blind, liquid crystal device, smart window, switchable window, smart glass, eglass, quantum dot devices, thermoelectric devices, batteries, LED, SED, FED, OLED, LCD, DLP, FLD, IMOD, TDEL, QDLED, TMOS, TPD, LCL, LPD, OLET, and combinations thereof.

EXAMPLES

Low melting glass compositions are produced by mixing together raw materials which are known to the art, and using methods known to those skilled in the art. The well mixed raw batch compositions are then melted at temperatures between 900 to 1300° C., followed by sudden cooling, again using methods known to those skilled in the art. The glass compositions are then ground to a particle size, preferably in the range of 6 to 10 microns using a ball mill or attritor milling. The ground glass powders are then used to form glass sealing compositions or sealing pastes. In order to make sealing pastes, the ground glass powder is dispersed and suspended in a vehicle selected for the end use application to form the sealing paste.

Testing is performed by screen printing the resulting paste on to a microscope slide glass substrate. The slides glass substrate are then fired at various temperatures to determine the "firing temperature", FT, The FT is the temperature where the glass has sufficient time to flow and fuse within a 15 minute fire and yield a glossy smooth surface (Preheat time is 15 minutes at 350° C. for FT).

The coefficient of thermal expansion (CTE), glass transition temperature ($T_g$), and dilatometric softening temperature ($T_d$) of the glasses were measured using dilatometer. Broadly the Td values in the inventive glasses are in the range of 370 to 525° C. The thermal expansions (CTE) are reported in the temperature range of 25° C. to 325° C. and has units of $10^{-6}$/° C.

The following glass compositions (Tables 2-4) were smelted, and tested. The terms CTE, Tg, Td and Firing temperature are defined elsewhere herein.

The sealing paste of the invention was prepared by mixing the vehicle and the sealing glasses as described in Table 5.

TABLE 2

Glass Composition Foimulation (weight %)

| (Wt. %) | 1 | 2 | 3 | 4 | 5 | 6 | 7 | 8 | 9 | 10 | 11 | 12 |
|---|---|---|---|---|---|---|---|---|---|---|---|---|
| $B_2O_3$ | 78 | 80 | 80 | 75 | 75 | 70 | 65 | 61.8 | 54 | 60 | 54 | 45 |
| $Na_2O$ | 3.5 | 2.7 | 3 | 2.6 | 6.5 | 2.3 | 1.8 | 3 | 3 | 2.5 | 6 | 6 |
| $Al_2O_3$ | 4.5 | 2.5 | 1 | 2.1 | 2.1 | 2.5 | 1 | 1.3 | 1 | 1.4 | 1.6 | 1 |
| $Li_2O$ | 1.5 | 1 | 1.5 | 1 | 1 | 1 | 1 | 1 | 1 | 1 | 1 | 1 |

TABLE 2-continued

Glass Composition Formulation (weight %)

| (Wt. %) | 1 | 2 | 3 | 4 | 5 | 6 | 7 | 8 | 9 | 10 | 11 | 12 |
|---|---|---|---|---|---|---|---|---|---|---|---|---|
| $TiO_2$ | 4.5 | 5 | 2.3 | 4.8 | 1.3 | 3.4 | 4.5 | 5.4 | 5 | 3.3 | 1.4 | 1 |
| ZnO | 2 | 0.2 | 2.2 | 2 | 2 | 4.8 | 8 | 2 | 10 | 6 | 1 | 1 |
| $Ta_2O_5$ | 0 | 0 | 0 | 0 | 0 | 0 | 0 | 0 | 0 | 0 | 0 | 0 |
| $Nb_2O_3$ | 0 | 0 | 0 | 0 | 0 | 0 | 0 | 0 | 0 | 0 | 0 | 0 |
| BaO | 4.5 | 6 | 6.3 | 10 | 10 | 14 | 17 | 18 | 22 | 23 | 35 | 45 |
| $ZrO_2$ | 0 | 0 | 3.7 | 0 | 0 | 0 | 0 | 3.5 | 0 | 0 | 0 | 0 |
| $SiO_2$ | 2 | 2.6 | 0 | 2.5 | 2 | 2 | 2 | 4 | 4 | 3.5 | 0 | 0 |
| CTE (ppm/° C.) (25-325)° C. | 7.26 | 7.4 | 6.8 | 7.53 | 7.81 | 6.27 | 6.55 | 6.94 | 6.89 | 7.02 | 8.92 | 10.47 |
| $T_g$ (° C.) | 380 | 350 | 383 | 385 | 414 | 438 | 455 | 451 | 460 | 475 | 455 | 455 |
| $T_d$ (° C.) | 428 | 402 | 429 | 433 | 459 | 481 | 497 | 491 | 510 | 523 | 501 | 509 |
| Density (g/cm³) at 25° C. | 2.22 | 2.17 | 2.26 | 2.33 | 2.34 | 2.45 | 2.66 | 2.61 | 2.88 | 2.77 | 2.99 | 2.81 |
| Firing temperature (° C.) | 500 | 485 | 500 | 520 | 530 | 550 | 585 | 580 | 580 | 620 | 600 | 580 |

TABLE 3

Glass Composition Formulation (weight %)

| (Wt. %) | 13 | 14 | 15 | 16 | 17 | 18 | 19 | 20 | 21 | 22 | 23 | 24 | 25 |
|---|---|---|---|---|---|---|---|---|---|---|---|---|---|
| $B_2O_3$ | 80 | 78 | 77 | 75 | 73 | 73 | 70 | 64 | 79.1 | 80 | 75 | 75.9 | 77.9 |
| $Na_2O$ | 6 | 5.9 | 5.8 | 5.2 | 5.9 | 6 | 5.5 | 6.2 | 6.5 | 6 | 6.5 | 6 | 6 |
| $Al_2O_3$ | 3 | 2.1 | 2.4 | 3 | 2.6 | 0.5 | 2.2 | 2.5 | 2.1 | 1 | 1 | 2.1 | 2.1 |
| $Li_2O$ | 1 | 1 | 1 | 1 | 1 | 1 | 1 | 1 | 1 | 1 | 1 | 1 | 1 |
| $TiO_2$ | 2 | 2 | 0.8 | 0.8 | 0.5 | 1 | 0.3 | 0.3 | 2 | 1 | 0.5 | 1 | 1 |
| ZnO | 1 | 1 | 1 | 1 | 1 | 0.5 | 1 | 1 | 2 | 1 | 1 | 1 | 1 |
| $Ta_2O_5$ | 7 | 10 | 12 | 14 | 16 | 18 | 20 | 25 | 0 | 0 | 0 | 5 | 6 |
| $Nb_2O_3$ | 0 | 0 | 0 | 0 | 0 | 0 | 0 | 0 | 6.5 | 10 | 15 | 4 | 5 |
| BaO | 0 | 0 | 0 | 0 | 0 | 0 | 0 | 0 | 0 | 0 | 0 | 4 | 0 |
| $ZrO_2$ | 0 | 0 | 0 | 0 | 0 | 0 | 0 | 0 | 0 | 0 | 0 | 0 | 0 |
| $SiO_2$ | 0 | 0 | 0 | 0 | 0 | 0 | 0 | 0 | 0 | 0 | 0 | 0 | 0 |
| CTE (ppm/° C.) (25-325)° C. | 8.98 | 9.19 | 8.65 | 8.89 | 8.65 | 8.95 | 8.45 | 8.05 | 8.79 | 9.2 | 8.8 | 8.19 | 8.77 |
| $T_g$ (° C.) | 350 | 349 | 351 | 328 | 334 | 349 | 338 | 360 | 350 | 340 | 351 | 375 | 345 |
| $T_d$ (° C.) | 396 | 391 | 398 | 374 | 383 | 393 | 388 | 405 | 396 | 380 | 402 | 414 | 389 |
| Density (g/cm³) at 25° C | 2.18 | 2.22 | 2.27 | 2.3 | 2.33 | 2.38 | 2.45 | 2.57 | 2.18 | 2.13 | 2.25 | 2.31 | 2.23 |
| Firing temperature (° C.) | 485 | 480 | 480 | 490 | 485 | 480 | 485 | 485 | 485 | 480 | 490 | 500 | 480 |

TABLE 4

Glass Composition Formulation (weight %)

| (Wt. %) | 26 | 27 | 28 | 29 | 30 |
|---|---|---|---|---|---|
| B2O3 | 75.81 | 77.78 | 76.11 | 70.58 | 73.25 |
| Na2O | 7.79 | 7.05 | 6.65 | 7.59 | 7.29 |
| Al2O3 | 8.67 | 10.06 | 6.69 | 14.94 | 11.83 |
| Li2O | 1.07 | 1.07 | 1.07 | 1.04 | 1.05 |
| TiO2 | 2.67 | 2.01 | 2.01 | 2.6 | 3.29 |
| ZnO | 2.67 | 2.01 | 2.01 | 1.95 | 1.97 |
| Ta2O5 | 0 | 0 | 0 | 0 | 0 |
| Nb2O3 | 0 | 0 | 0 | 0 | 0 |
| BaO | 0 | 0 | 4.12 | 0 | 0 |
| ZrO2 | 0.44 | 0 | 0.45 | 0.43 | 0.44 |
| SiO2 | 0.89 | 0 | 0.89 | 0.87 | 0.88 |
| CTE (ppm/° C.) (25-325)° C. | 8.47 | 8.79 | 7.18 | 7.71 | 8.07 |
| $T_g$ (° C.) | 375 | 365 | 360 | 400 | 385 |
| $T_d$ (° C.) | 419 | 411 | 421 | 434 | 421 |
| Density (g/cm³) at 25° C. | 2.16 | 2.15 | 2.23 | 2.19 | 2.18 |
| Firing temperature (° C.) | 510 | 500 | 500 | 500 | 510 |

TABLE 5

Sealing Glass Paste Composition Formulation (weight %)

| Glass ID | paste 1 | paste 2 | paste 3 | paste 4 | paste 5 | paste 6 | paste 7 | paste 8 | paste 9 | paste 10 | paste 11 | paste 12 | paste 13 |
|---|---|---|---|---|---|---|---|---|---|---|---|---|---|
| Glass # 2 | 75 | 0 | 0 | 0 | 0 | 0 | 0 | 0 | 0 | 0 | 0 | 0 | 0 |
| Glass # 3 | 0 | 75 | 0 | 0 | 0 | 0 | 0 | 0 | 0 | 0 | 0 | 0 | 0 |
| Glass # 14 | 0 | 0 | 76 | 0 | 0 | 0 | 0 | 0 | 0 | 0 | 0 | 0 | 0 |
| Glass # 15 | 0 | 0 | 0 | 77 | 0 | 0 | 0 | 0 | 0 | 0 | 0 | 0 | 0 |

TABLE 5-continued

| Sealing Glass Paste Composition Formulation (weight %) | | | | | | | | | | | | | | |
|---|---|---|---|---|---|---|---|---|---|---|---|---|---|---|
| Glass # 16 | | 0 | 0 | 0 | 0 | 78 | 0 | 0 | 0 | 0 | 0 | 0 | 0 | 0 |
| Glass # 18 | | 0 | 0 | 0 | 0 | 0 | 78 | 0 | 0 | 0 | 0 | 0 | 0 | 0 |
| Glass # 19 | | 0 | 0 | 0 | 0 | 0 | 0 | 77 | 0 | 0 | 0 | 0 | 0 | 0 |
| Glass # 21 | | 0 | 0 | 0 | 0 | 0 | 0 | 0 | 76 | 0 | 0 | 0 | 0 | 0 |
| Glass #24 | | 0 | 0 | 0 | 0 | 0 | 0 | 0 | 0 | 77 | 0 | 0 | 0 | 0 |
| Glass # 25 | | 0 | 0 | 0 | 0 | 0 | 0 | 0 | 0 | 0 | 76.8 | 0 | 0 | 0 |
| Glass # 27 | | 0 | 0 | 0 | 0 | 0 | 0 | 0 | 0 | 0 | 0 | 76 | 0 | 0 |
| Glass # 28 | | 0 | 0 | 0 | 0 | 0 | 0 | 0 | 0 | 0 | 0 | 0 | 76 | 0 |
| Glass # 29 | | 0 | 0 | 0 | 0 | 0 | 0 | 0 | 0 | 0 | 0 | 0 | 0 | 77 |
| Vehicle* | | 25 | 25 | 24 | 23 | 22 | 22 | 23 | 24 | 23 | 23.2 | 24 | 24 | 23 |
| *Vehicle Component Ratio | Texanol | 48 | 48 | 48.1 | 48.2 | 48 | 48.2 | 48.2 | 48 | 48 | 48.2 | 48 | 48 | 48 |
| | Butyl Carbitol Acetate | 24.5 | 25 | 24.7 | 24,2 | 24.6 | 24.1 | 24.6 | 24.5 | 25 | 24.6 | 24.6 | 24.7 | 24.5 |
| | Acrylic Resin | 18.1 | 18 | 18 | 18 | 18.3 | 18 | 18 | 18.2 | 18 | 18 | 18.3 | 18.1 | 18.1 |
| | Surfactant | 9.4 | 9 | 9.2 | 9.6 | 9.1 | 9.7 | 9.2 | 9.3 | 9 | 9.2 | 9.1 | 9.2 | 9.4 |
| Sealing Temperature (° C.) | | 500 | 500 | 500 | 500 | 500 | 510 | 510 | 500 | 500 | 500 | 500 | 530 | 525 |
| Sealing time (min) | | 20 | 30 | 20 | 20 | 20 | 30 | 30 | 30 | 30 | 20 | 30 | 30 | 30 |

In Table 5, Texanol® is an ester alcohol commercially available from Eastman Chemical Company. The Acrylic resin is Elvacite® 2043 having a molecular weight of 50,000. Surfactant is Nuosperse® 700 from Elementis Specialties.

Figure 1C:
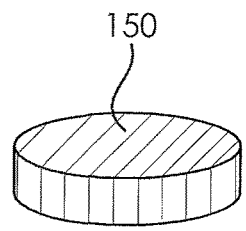
FIG. 1C shows an active layer to be sealed between the first and second substrates prior to sealing and firing.
Figure 1B:
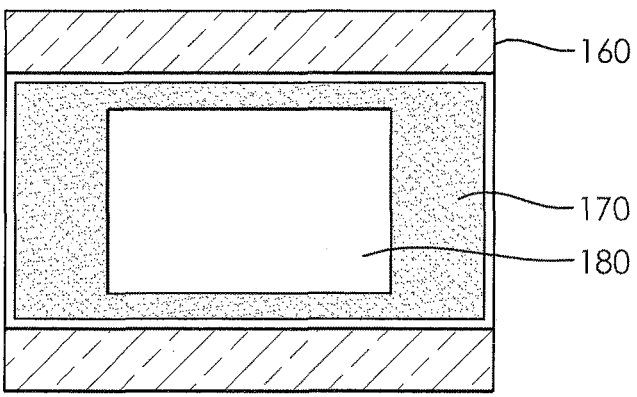
FIG. 1B shows a second substrate coated with a paste of the invention and prior to sealing and firing.
Figure 2:
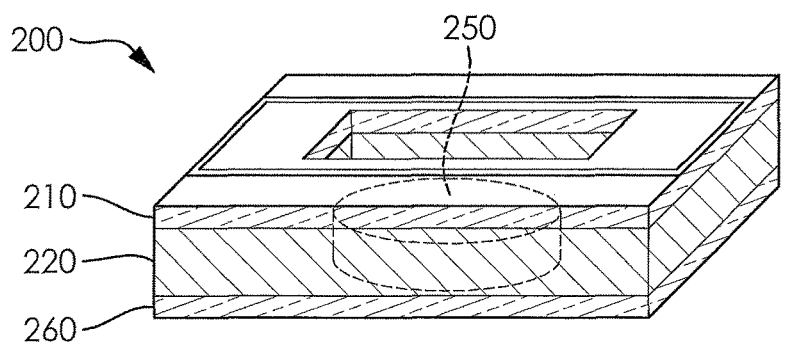
FIG. 2 shows two substrates sealed together according to the invention with an active layer therebetween.

FIG. 1 shows two coated substrates 110 (FIG. 1A) and 160 (FIG. 1B) and an active layer 150 (FIG. 1C). A paste 120, 170 from Table 5 is applied to each of two soda lime glass substrates 110, 160 to a wet thickness of 90 microns. The entire substrates 110, 160, may, but need not, be covered with pastes 120, 170, and a central gap 130, 180 may be left, for example in the shape of a square, circle or other shape. The pastes 120, 170 may, but need not, extend to the edge of the substrates 110, 160. The coated substrates are dried at a temperature of, about 150° C., and then low-temperature fired, at about 350° C. for 15 minutes, to burn out the organic vehicle leaving behind the glass frit adhered to the substrates. The substrates are then pressed together, optionally with an active layer 150 positioned therebetween. The substrates 110, 160, are fired at a temperature of 480-530° C. for 15 minutes to sinter the glasses in the pastes together and thereby form, as shown in FIG. 2, a seal 220, with assembly 200, including post-fired substrates 210 and 260 corresponding to pre-fired substrates 110 and 160, with active layer 250 therebetween, corresponding to active layer 150. The post-fired seal thickness 220 is approximately 80 microns.

The samples were evacuated via a hole drilled (3 mm diameter) in one of the glass plates (of the post fired sealed samples) to rough vacuum thereby applying approximately one atmosphere of pressure differential across the seal. Samples that cannot be evacuated to less than 100 mTorr as measured by a Pirani gauge downstream of the sample are deemed defective and are considered to fail the leak test. The inventive glass seals were tested for their hermeticity by this leak test and seals. The seals held (did not leak) when evacuated down to vacuum levels of $10^{-4}$ to $10^{-7}$ Torr.

From the glass and paste formulations developed above, the inventors have reached several conclusions. Oxides herein may be referred to by their metal only. CTE values are given in units of $10^{-6}$/° C. Looking to glass 3 including zero silica, low values for both CTE (6.8) and firing temperature (500° C.) are achieved. It is noted that glass 3 contains less barium than examples 8 and 9, and zero silica, yet low expansion and firing temperatures are possible.

For example, in glass examples 10-11-12, one can see that increasing the barium content increases the firing temperature, and that when the barium content is less than 14 wt % (see glasses 1-6 in context with glass 7), the firing temperature is less than 550° C. Looking to glass 24, when the total of barium, tantalum and niobium is less than 15 wt %, the firing temperature is 500° C. and the expansion is only 8.19. The firing temperature in all of examples 21-25 is 500° C. or less at least partially owing to the fact that the total of barium, tantalum, and niobium is less than 15 wt %.

Glass 20 has 25 wt % $Ta_2O_5$ while glass 21 has no $Ta_2O_5$ but a small amount of $Nb_2O_3$ (6.5 wt %) and both have a firing temperature of only 485° C. and low CTEs of ~8.1 and ~8.8. The foregoing can be compared to glass 23 which has no tantalum but significant niobium (15 wt %) and still has low firing temperature (490° C.) good CTE (8.8).

Glasses 13-20 can be reviewed with increasing tantalum, no silica and essentially the same firing temperature (480-490° C.) and CTE are in the range of 8.0-9.1.

In Table 4 it is evident that an increase in alumina gives essentially the same firing temperature (500-510° C.) with high boron (~70-78 wt %). Good (low) expansion of ~7.2 to 8.8 is seen in Table 4.

Details about aspects of the invention can be found in one or more of the following United States Patent Applications, all of which are incorporated herein by reference: Ser. Nos. 10/864,304; 10/988,208; 11/131,919; 11/145,538; 11/384,838; 11/774,632; 11/846,552; 12/097,823; 12/298,956; 12/573,209; 13/641,046; 13/642,553; 13/808,422; and 13/808,571.

The term "comprising" provides support for "consisting essentially of" and "consisting of" It is envisioned that an individual numerical value for a parameter, temperature, weight, percentage, etc., disclosed herein in any form, such as presented in a table, provides support for the use of such value as the endpoint of a range. A range may be bounded by two such values. In a single embodiment, more than one glass composition can be used, and compositions comprising amounts and ranges from different columns among the tables are also envisioned.

Certain embodiments of the invention are envisioned where at least some percentages, temperatures, times, and ranges of other values are preceded by the modifier "about." All compositional percentages are by weight and are given for a blend prior to firing. Numerical ranges of oxides or other ingredients that are bounded by zero on the lower end (for example; 0-15 wt % ZnO) are intended to provide support for the concept "up to [the upper limit]," for example "up to 5 wt % $ZrO_2$," as well as a positive recitation that the ingredient in question is present in an amount that does not exceed the upper limit.

Each numerical range disclosed herein that is bounded by zero, has, as alternative embodiments, a lower bound of 0.01% or 0.1% instead of zero. All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 2.7, 3.3 to 8.9, 5.7 to 10, or individual values like 3.14159, 5.17, 8.07 or 9.58 for example. In other words, ranges are used as shorthand for describing each and every value that is within the range. Any value within the range can be selected as a terminus of a subrange within the range.

The invention claimed is:

1. A glass composition consisting of (a) 45-81 wt % $B_2O_3$, (b) 1-7 wt % $Na_2O$, (c) 0.1-5 wt % $Al_2O_3$, (d) 0.1-2 wt % $Li_2O$, (e) 0.5-6 wt % $TiO_2$, (f) 0.1-9 wt % ZnO (g) 4-25 wt % BaO, and no lead, no bismuth and no vanadium.

2. The glass composition of claim 1 having a firing temperature less than 600° C.

3. The glass composition of claim 1 having a firing temperature less than 500° C.

4. The glass composition of claim 1 having a dilatometric softening temperature of 370 to 525° C.

5. The glass composition of claim 1 having a CTE of 7.0 to 8.0×$10^{-6}$/° C.

6. A paste composition comprising an organic vehicle and the glass composition of claim 1.

7. A device including a seal, the device formed by a method of heating a sealing material comprising:
   a. providing at least two substrates,
   b. providing a sealing material, comprising the glass composition of claim 1,
   c. contacting the seal material to the at least two substrates, and
   d. firing the seal material to a temperature of no greater than 600° C., whereby a seal between the substrates results.

8. The device of claim 7, wherein the device and the seal form a cavity, and wherein an active layer selected from the group consisting of solar cell, solar cell contact, organic PV device, plasma display devices, nanocrystal display, electrochromic device, electrochromic material system, suspended particle device, micro-blind, liquid crystal device, smart window, switchable window, smart glass, eglass, LED, SED, FED, OLED, LCD, DLP, FLD, IMOD, TDEL, QDLED, TMOS, TPD, LCL, LPD, OLET, and combinations thereof is situated within the cavity.

9. An electronic device or circuit including a fired paste or thick film including the glass composition of claim 1.

10. The electronic device or circuit of claim 9, wherein the electronic device or circuit is selected from the group consisting of surge resistors, high-current high-power automotive electronics, automotive sensors, air bag deployment sensors, weight-sensors, anti-lock braking systems, defrosters, thick film circuitry on automotive windshields, solar cells, and solar panels.

11. A glass composition consisting of (a) 45-81 wt % $B_2O_3$, (b) 1-7 wt % $Na_2O$, (c) 0.1-5 wt % $Al_2O_3$, (d) 0.1-2 wt % $Li_2O$, (e) 0.5-6 wt % $TiO_2$, (f) 0.1-9 wt % ZnO (g) 4-25 wt % BaO, and at least one of (h) 5-25 wt % $Ta_2O_5$, (i) 6-15 wt % $Nb_2O_3$, (j) 0.1-5 wt % $ZrO_2$, and (k) 0.1-5 wt % $SiO_2$ and no lead, no bismuth and no vanadium.

12. The glass composition of claim 11 having a firing temperature less than 600° C.

13. The glass composition of claim 11 having a firing temperature less than 500° C.

14. The glass composition of claim 11 having a dilatometric softening temperature of 370 to 525° C.

15. The glass composition of claim 11 having a CTE of 7.0 to 8.0× $10^{-6}$/° C.

16. A paste composition comprising an organic vehicle and the glass composition of claim 11.

17. A device including a seal, the device formed by a method of heating a sealing material comprising:
   a. providing at least two substrates,
   b. providing a sealing material, comprising the glass composition of claim 11,
   c. contacting the seal material to the at least two substrates, and
   d. firing the seal material to a temperature of no greater than 600° C., whereby a seal between the substrates results.

18. The device of claim 17, wherein the device and the seal form a cavity, and wherein an active layer selected from the group consisting of solar cell, solar cell contact, organic PV device, plasma display devices, nanocrystal display, electrochromic device, electrochromic material system, suspended particle device, micro-blind, liquid crystal device, smart window, switchable window, smart glass, eglass, LED, SED, FED, OLED, LCD, DLP, FLD, IMOD, TDEL, QDLED, TMOS, TPD, LCL, LPD, OLET, and combinations thereof is situated within the cavity.

19. An electronic device or circuit including a fired paste or thick film including the glass composition of claim 11.

20. The electronic device or circuit of claim 19, wherein the electronic device or circuit is selected from the group consisting of surge resistors, high-current high-power automotive electronics, automotive sensors, air bag deployment sensors, weight-sensors, anti-lock braking systems, defrosters, thick film circuitry on automotive windshields, solar cells, and solar panels.

* * * * *